No. 11,933. Reissued Sept. 24, 1901.

C. DE CROES.

VOTING MACHINE.

(Application filed Apr. 13, 1901.)

3 Sheets—Sheet 1.

WITNESSES:

Wm. H. Payne.

Sara Alexander

INVENTOR:

Clement De Croes.

BY

E. T. Silvius,

ATTORNEY.

No. 11,933. Reissued Sept. 24, 1901.

C. DE CROES.

VOTING MACHINE.

(Application filed Apr. 13, 1901.)

3 Sheets—Sheet 2.

WITNESSES:

Wm. H. Payne.

Sara Alexander.

INVENTOR:

Clement De Croes.

BY E. T. Silvius.

ATTORNEY.

No. 11,933. Reissued Sept. 24, 1901.

C. DE CROES.

VOTING MACHINE.

(Application filed Apr. 13, 1901.)

3 Sheets—Sheet 3.

WITNESSES:

Wm. H. Payne.

Sara Alexander.

INVENTOR:

Clement De Croes.

BY E. T. Silvius,

ATTORNEY.

UNITED STATES PATENT OFFICE.

CLEMENT DE CROES, OF WESTPORT, INDIANA, ASSIGNOR, BY DIRECT AND MESNE ASSIGNMENTS, TO BENJAMIN BAER, OF PAXTON, ILLINOIS.

VOTING-MACHINE.

SPECIFICATION forming part of Reissued Letters Patent No. 11,933, dated September 24, 1901.

Original No. 594,986, dated December 7, 1897. Application for reissue filed April 13, 1901. Serial No. 55,791.

*To all whom it may concern:*

Be it known that I, CLEMENT DE CROES, a citizen of the United States, residing at Westport, in the county of Decatur and State of Indiana, have invented certain new and useful Improvements in Voting-Machines; and I do hereby declare the following to be a full, clear, and exact description of the invention, such as will enable others skilled in the art to which it appertains to make and use the same.

This invention has reference to a novel construction in a machine for registering votes.

The object of the invention is to provide a cheaply-constructed mechanism which may be depended upon to operate accurately without requiring the parts thereof to be finished and fitted so nicely as to be expensive in construction, and a further object is to construct a voting-machine of the fewest possible parts in order to attain the degree of economy desired.

Broadly the invention consists in a key-operated register, in vertically-moving lock-outs for all the registers, and in horizontally-moving lock-outs forming parts of the vertically-moving lock-outs for the remaining registers in horizontal rows after one register in such a row may have been operated.

Specifically it consists in a novel construction and in the separate parts and the combination and arrangement of parts, as hereinafter particularly described and claimed.

Figure 1:
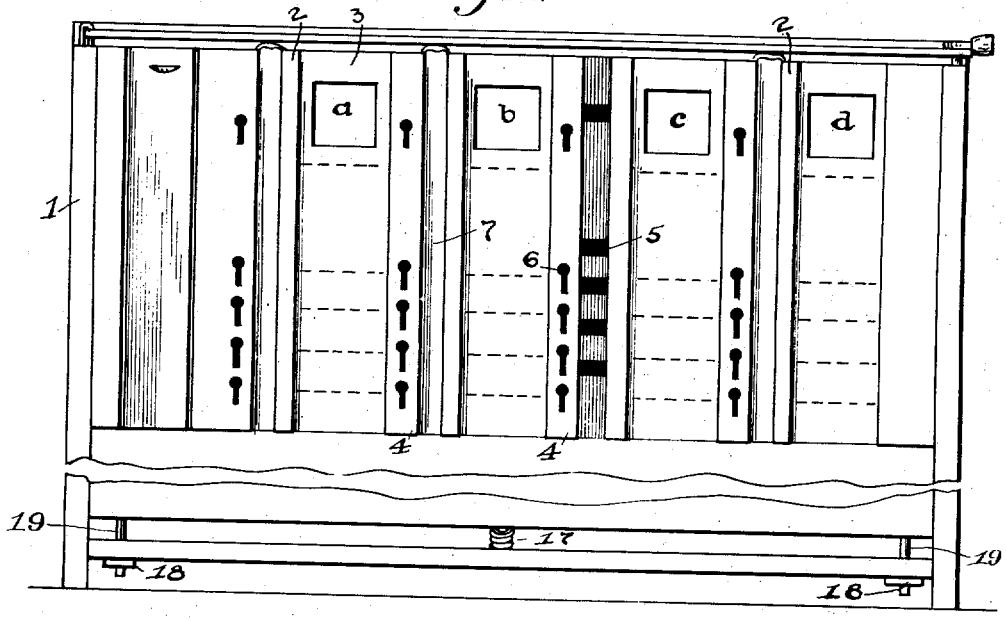
Figure 2:
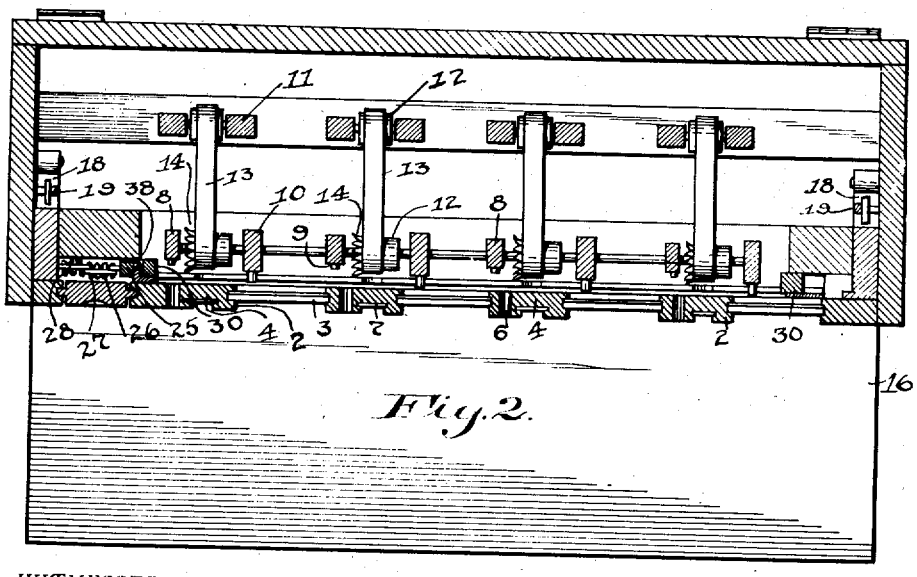
Figure 3:
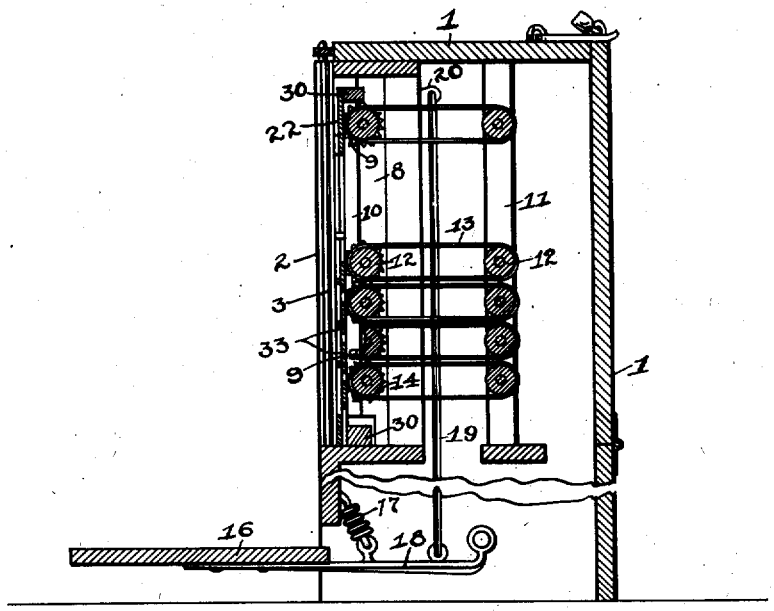
Figure 6:
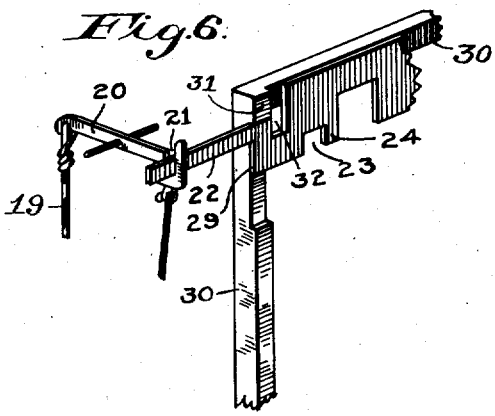
Figure 7:
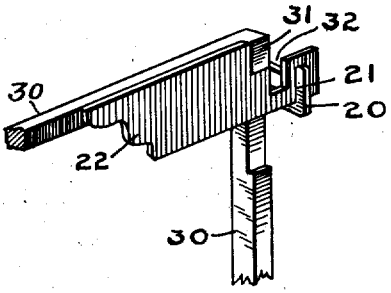
Figure 4:
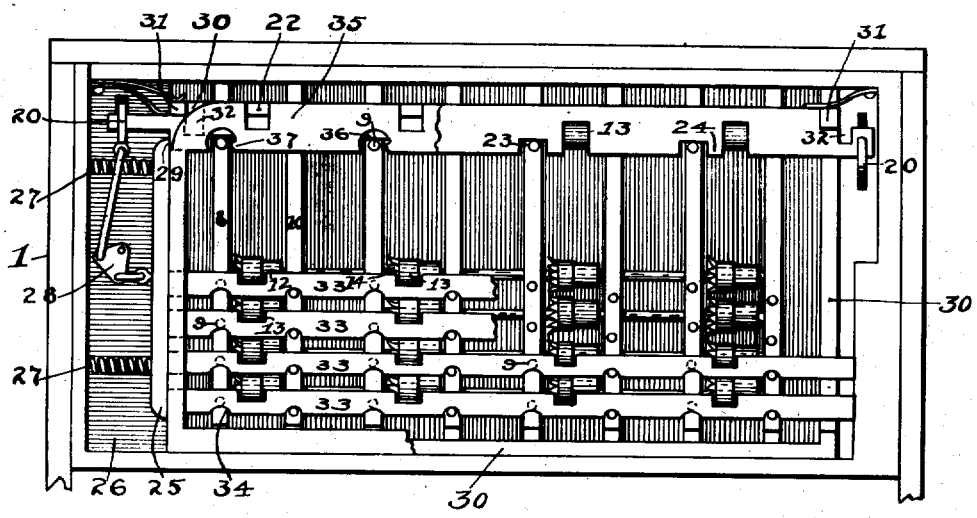
Figure 8:
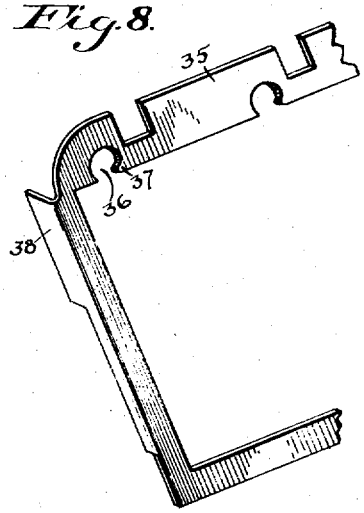
Figure 5:
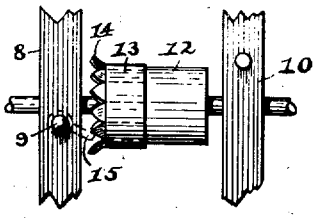

In the accompanying drawings, forming a part of this specification, Figure 1 is a front elevation of a machine constructed in accordance with this invention. Fig. 2 is a horizontal section of the same. Fig. 3 is a vertical transverse section. Fig. 4 is a front view with the front portion of the casing removed, and Figs. 5, 6, 7, and 8 are fragmentary detail views that will be understood in connection with the following description.

Similar reference characters in the several views of the drawings indicate corresponding parts.

It will be understood, of course, that although in the accompanying drawings I have shown a machine capable of holding four tickets or ballots, with four names on each ballot, yet the machine can be increased in capacity to any desired number of ballots and with any number of names on each ballot, as is obvious. The machine is so constructed that all candidates on any one ticket can be simultaneously voted for or different candidates may be selected from several tickets and voted for. The machine is also provided with devices so arranged that when a vote is first cast for the whole number of candidates on a party ticket another vote cannot be cast either for all the candidates of another party or for an individual candidate. The parts are also further arranged that if any particular candidate is selected and voted for the operation of the machine in registering this vote throws the parts into such positions that neither an entire number of party candidates can be voted for subsequently nor can another vote be cast for any other candidate for the office for which the candidate has been selected.

In said drawings the machine is shown as an entirety—that is to say, without the surrounding booth, although it is understood that each machine can have a booth which incloses the same, so that the vote can be cast secretly.

Referring now to said drawings, 1 indicates the casing of the machine, the front piece of which is provided with a plurality of upright guides 2 to receive panels of glass 3, behind each of which the ticket is placed. The guides are formed between the strips 4, and these strips have a plurality of openings 5 and a corresponding number of keyholes 6, situate opposite the openings, a keyhole at each opening. The openings are to expose portions of the registers upon which the number of votes registered may be read and are closed by means of the sliding plates 7, which, if found convenient, may be suitably locked in position, to be removed only by the judges of election or other persons in authority. The keyholes 6 are opposite the names of the different candidates upon the tickets, (indicated as *a b c d*,) exposed between the upright strips 4. In the rear of the strips 4 are the supports 8, on the outer faces of which are a plurality of key-posts 9, corresponding to the number of keyholes 6 and in range therewith, to receive and guide the keys which are used to operate the registers and at the same time to actuate the lock-outs for the remaining registers of a horizontal row after one register in such row may have been operated.

I will now proceed to describe the devices for registering the different votes.

Adjacent to the supports 8 are other similar members or supports 10, and in the rear of these supports 8 and 10 are other suitable supports 11. Mounted upon the said supports above mentioned are the rollers 12, arranged in pairs, each pair comprising a forward roller and a rear roller, the forward one of each pair being the driver and situated near a key-post, the pairs corresponding in number to the number of key-posts employed. Bands 13 connect the rollers in pairs and are provided on their outer surfaces with numbers running to any desired figure, the bands running over the rollers when suitably driven, the said forward or driving rollers being provided with crown-wheels 14, situated in suitable positions, so as to be engaged by the blade of a key 15. (Shown in broken lines in Fig. 5.) The key employed may be similar to a drawer-lock key having a socket in the end of its stem to fit over and be guided by the key-post 9. Thus it will be seen that when the key is inserted and rotated on the key-post the blade of the key will swing into engagement with the adjacent crown-wheel and cause the driving-roller attached thereto to partially rotate, and the parts are so designed and arranged that when operated the band will move a proper distance to bring the next succeeding number thereon opposite the opening 5.

In front of the casing 1 is a movable platform 16, upon which the person must stand to register a vote—that is to say, this platform is pivoted and is held normally in an elevated position by the spring 17. This platform is connected with the upright parts of the device, so that when it is lifted it moves the parts into such positions that a key cannot be inserted within any of the keyholes sufficiently far to register a vote. In the particular construction illustrated said platform is provided with two rearwardly-extending arms 18, pivoted at their rear ends to the casing of the machine and connected by means of upwardly-extending rods or chains 19 with the pivoted lever 20 near the upper end of the casing. The forward ends of the pivoted lever 20 are notched, as shown at 21, to receive the ends of the main operating-bar 22. The said bar 22 rests within the notches of the lever and is capable of a longitudinal movement with relation thereto, as seen. The said main operating-bar 22 is employed for preventing the use of the key-posts 9 in the horizontal row behind said bar, and thereby locking out the registers in said row. It is also employed for controlling the vertically-moving locking-out members, as will be seen hereinafter. In operating the key on said key-posts behind said bar 22 the votes for the entire number of candidates on a ticket are registered by the registers adjacent to said posts representing all the candidates. In the lower edge of said bar 22 are a plurality of notches 23 to receive the blade of the key. The parts are so arranged, however, that when the platform is elevated the forward ends of the levers 20 are depressed, and therefore the lower edge of the bar 22 in the notches rests upon the ends of the posts 9. To register a so-called straight party vote it is necessary that the key should pass inward until it bears against the support 8, and it is seen, therefore, that the edge of this bar, resting upon the post 9, will prevent the insertion of the key far enough to allow the blade thereof to reach the crown-wheel of the driving-roller. It will be seen also that upon depressing the platform the said bar 22 will be raised so that the post 9 will be clear and permitted to receive the key, so that the key can operate the crown-wheel. In registering a vote representing all candidates on a ticket the key is turned to the left, and it first engages a tooth of the crown-wheel, and then the key strikes the side of the notch 23 and moves the main operating-bar 22 to the left. This has the effect, as will be hereinafter explained, of preventing further voting not only for the whole number of candidates, but for the individuals. To lock out the registers for all the candidates of an entire ticket by thus registering one vote, the said bar is provided with downwardly-extending fingers 24 on the side of the notch, and when the bar is moved to the left, as shown, it moves a finger to the left and adjacent to the key, so that an attempt to rotate the key a second time or to insert it in any of the other keyholes for another attempt to rotate the same will be prevented by the contact of the blade of the key with a finger. It will be noted that it is also impossible to return the key to its first position and diminish the number registered, for in turning the key to the left the longitudinally-movable bar is moved until the projections 31 of the frame 30 enter the notches or depressions in the longitudinal bar, which will be described hereinafter. The said operating-bar cannot be moved to its original position until the voter leaves the platform, since only the upward movement of the platform permits and causes the parts to return to their normal positions. The said bar is returned to its normal position by means of a spring-pressed follower 25. This follower is situated within a chamber 26 at one side of the casing and is provided with springs 27. Within the casing is a pivoted bell-crank lever 28, having one end connected with the follower 25, while its other end is connected with the forward end of the lever 20. In this way it is seen that when the end of the lever is raised by the depression of the platform the follower is moved to the left against the action of the springs 27. The main operating-bar 22 is provided with a shoulder 29, situated within the path of the follower 25. It will be noticed, therefore, that when the bar is raised the said follower is moved to one side, and consequently that the bar is moved to the left by the key, and that when the platform is allowed to assume its normal position the return movement of the follower 25, by reason of the engagement between said follower and the shoulder 29, will move the operating-bar 22 to the right again, or to its normal position.

I will now proceed to describe the devices for registering the individual votes upon each ticket.

Mounted in upright guides just behind the front piece of the casing and behind the bar 22 is a rectangular frame 30. This frame extends from the bottom almost to the top of the machine and is provided at its upper corners with forward projections 31, that normally rest upon the upper edge of the operating-bar 22. In this way it is seen that when the operating-bar is raised this frame is raised likewise. There is a depression or notch 32 in the upper edge of the main operating-bar adjacent the point upon which these projections rest to allow the frame to fall when the bar 22 is moved longitudinally—that is to say, when the bar and the frame are in elevated positions. The sides of the frame are provided with guides to receive a plurality of longitudinally-movable bars 33. These bars 33 are situated opposite each set of rollers and are movable in an upright direction with the frame, while they are adapted to be moved longitudinally by the key. Each one of the bars is provided with a notch 34 situated opposite a post 9, for the key. When the frame is at the lower limit of its movement, the said bars stand opposite the ends of the posts to prevent the insertion of the key; but when the frame is raised by the operating-bar all of these bars 33 are raised also and the ends of the posts 9 are exposed, so that the key can be inserted to be turned and cause the rotation of the adjacent roller and the longitudinal movement of the bar 33. It is noted, of course, that in this position the follower 25 would recede, so that the bars 33 can move longitudinally. It is obvious, further, that by the longitudinal movement of a bar 33 all notches 34 of the same bar will appear in changed positions, so that the bar at one side of each notch will stand in the path of the blade of the key to prevent the insertion and turning of the key in any one of the remaining keyholes for moving this bar. The movement of any one of the bars 33 serves, further, to prevent the full insertion of the key in any of the keyholes for moving the main operating-bar 22. This construction comprises a horizontally-sliding plate 35 at the upper end of the casing, which is provided with a slot 36, having a finger 37. The plate 35 is provided with a downwardly-projecting arm 38, that lies flat against the end piece of the frame 30, and when the follower is retracted by the depression of the platform it is seen that this arm 38 is moved by the longitudinal movement of a bar 33, and consequently slides the plate 35 to one side and brings the finger 37 across the keyhole. It is obvious that the other bars 33 can be moved by the key by the insertion thereof in any of the keyholes for this purpose. The said main operating-bar 22 and the frame 30 move by gravity, it being noted that in a larger machine they possess sufficient weight to carry out this operation. It will thus be seen that when the platform is raised all the registers are locked out automatically, and it is obvious that the rods or chains 19 may within the scope of my invention be connected to and be operated by suitable booth-doors, simple means well known being employed in forming a suitable connection. It will be noticed also that in the act of locking out the registers the follower 25 will push the plate 35 back to its original position and at the same time push the bars 33 that may have been moved in voting also to their former positions.

It should be understood that the plate 35 (although broken away in the views) extends from the side of the frame 30 where it is engaged by the follower 25 to substantially the opposite side of the frame 30. The main operating-bar, as will be seen, may move a prescribed distance vertically with relation to the frame 30; but the bars 33 are so mounted on the front of the frame 30 that they may move only in a horizontal direction relatively to the frame 30 and obviously with said frame vertically.

I will now proceed to describe the manner in which the machine is used to register votes.

The different tickets exposed are marked *a*, *b*, *c*, and *d*, beginning from the left. If the voter desires to vote for all candidates on any one of the tickets, he steps upon the platform, which raises the forward end of the lever 20 and retracts the follower 25. The upward movement of the operating-bar, caused by the elevation of the levers, raises the frame 30, and thus all the key-posts become unobstructed to the reception of the key. The voter then places the key, for instance, in the upper keyhole at the left of ticket *a* and turns the key to the left. This has the effect of turning the roller a sufficient distance to bring the next number upon the band, representing all of the candidates on this ticket, in position behind the opening 5, while at the same time it strikes against the side of the notch 23 in the bar 22 and moves this bar to the left. The movement of the bar to the left carries the operative parts thereof at the sides of the notches 32 to the left, so that the notches range with the projections 31 of the rectangular frame, and this allows this rectangular frame to fall, which has the effect of moving the bars 33, carried thereby, against the ends of the posts 9. The voter then withdraws the key, and it is obvious that he cannot place it in any other keyhole of the machine, since he is prevented from turning it within an upper keyhole by reason of the fingers 24 of the bar 22 and by reason of the fact that the bars 33 stand against the ends of the posts 9 at their keyholes. When the voter steps off the platform, the latter rises and permits the bar 22 to fall, while it allows the follower to move back in place. The follower consequently engages the shoulder 29 of the bar 22 and moves it to the right to bring the upper edge thereof below the projections 31 of the frame 30. If the voter does not care to vote the "straight ticket," as it is called, but, for instance, should desire to vote for one candidate upon each of these tickets, providing, of course, that none of the different candidates are for the same office, he does not place the key in the upper keyhole, but will proceed in the following manner: We will suppose he desires to vote for the first candidate in ticket *a*, the second in ticket *b*, the third in ticket *c*, and the fourth in ticket *d*. He first places the key in the second keyhole adjacent ticket *a*, and by turning the key to the left he turns the roller and the band and then moves the upper bar 33 to the left. This not only has the effect of moving the bar 33 to the left, so that the notches 34 therein prevent the turning of the key within the keyhole, so that the candidates for the same office on the other tickets cannot be voted for, but the movement of this bar longitudinally moves the arm 38 and sliding plate 35 to the left and moves the finger 37 of the sliding plate across all the upper keyholes, and this prevents the complete insertion of the key therein. Then the voter may remove the key and vote for any other candidate in the other tickets by inserting the key respectively in the third, fourth, and fifth keyholes opposite tickets *b*, *c*, and *d*. It will be seen, further, that the stops upon the supports 8 and 10 prevent the upward movement of the bars 33 and also that when the voter steps off the platform the returning follower strikes against the arm 38 and moves the bars 33 to their longitudinal position. It is noted, of course, that when the lower keyholes are used the operating-bar 22 is not used.

The casing can be locked in such a manner that it will be inaccessible except to authorized persons and can be made to accommodate any number of tickets or candidates upon each ticket as found most convenient.

Having thus described my invention, what I claim as new, and desire to secure by Letters Patent, is—

1. A voting-machine including a series of registers provided each with a toothed wheel, a key adapted to engage any one of the toothed wheels, and a series of vertically-moving and also horizontally-moving lock-out members whereby the key may be prevented from engaging the toothed wheels.

2. A voting-machine including a main operating and lock-out bar combined, key-posts situated so as to be locked out by the vertical movement of the main operating and lock-out bar combined, a frame controlled vertically by the said bar and operating jointly with said bar so as to limit the horizontal movement thereof whereby said key-posts may also be locked out by the horizontal movement of said bar.

3. A voting-machine including a series of key-posts, a series of registers each provided with a toothed wheel mounted rotatively adjacent a key-post, vertically-moving lock-outs for the key-posts, also horizontally-moving lock-outs for the key-posts, and a key whereby the toothed wheels may be engaged.

4. A voting-machine including a rectangular frame, a main operating and lock-out bar mounted so as to slide longitudinally across the frame to a limited extent and in one of its positions supporting the frame, longitudinally-sliding lock-out bars mounted on the frame, means for elevating and depressing the lock-out bars, a series of registers so situated as to be in range of the lock-out bars, and an insertible key whereby the registers may be operated when not locked out.

5. A voting-machine including a vertically-sliding frame, a main operating-bar sliding longitudinally and whereby the frame may be suspended, longitudinally-sliding lock-out bars supported by the frame, a series of registers, a key whereby the registers may be operated and the lock-out bars actuated, and a follower whereby the lock-out bars may be actuated in a direction opposite to that in which they may be moved by the key.

6. A voting-machine including a series of registers, means for actuating the registers, a frame having projections thereon, a main operating-bar whereby the frame may be elevated when in contact with the projections and having notches wherein the projections may enter whereby the frame may be permitted to descend, means whereby the main operating-bar may be elevated, means whereby the registers may be operated, and lock-out members carried by the frame whereby operation of the registers may be prevented.

7. A voting-machine including a series of registers, a key for actuating the registers, a vertically-moving frame, a combined main operating-bar and lock-out bar controlling the vertical movement of the frame and having a plurality of notches and adjacent fingers at an edge thereof whereby the bar may be operated by the key when operating a register and whereby other registers may be locked out.

8. A voting-machine including a series of registers, means whereby the registers may be actuated, a vertically-moving frame, a series of longitudinally-moving members whereby the registers may be locked out supported by the vertically-moving frame, a follower engaging all the longitudinally-moving members and normally preventing the movement thereof, means whereby the follower may be withdrawn to permit the operation of said members, and means whereby the follower may be caused to return said members to their normal positions after having been operated.

9. A voting-machine including a series of registers each provided with a toothed or crown wheel, a key-post situated adjacent to a toothed wheel, a key having a socket to receive the key-post and having a blade to engage the teeth of the toothed wheel, a vertically-sliding frame, a series of lock-out bars mounted slidingly upon the frame and carried vertically thereby and having each a series of notches wherein the key may enter and operate the bar and a register and also lock out other registers.

10. A voting-machine including a series of registers, a series of key-posts situated adjacent to the registers, a key whereby the key-posts may be engaged and the registers operated, a vertically-sliding frame, a series of sliding lock-out bars mounted on the frame so as to be operated by the key and caused to prevent the engagement of other key-posts by the key, and a horizontally-sliding plate having notches and fingers at an edge thereof whereby when one of the lock-out bars may have been operated another lock-out bar and a plurality of registers may be closed against operation thereof.

11. A voting-machine including a series of registers, means whereby the registers may be actuated, a series of lock-out members whereby operation of the registers may be prevented, a plate having notches and adjacent fingers corresponding in number to the number of registers in a horizontal row, an arm attached to the plate whereby when engaged by a lock-out member said fingers may be moved and lock out a horizontal row of registers against operation thereof, and a follower whereby said arm may be engaged and the lock-out members that may have been operated moved back to their normal positions.

12. A voting-machine comprising a casing having keyholes therein, a plurality of registers, a key insertible in the keyholes whereby the registers may be engaged and operated, a sliding lock-out bar movably supported whereby the keyholes may be closed to the key and operation of the registers prevented, and means whereby the lock-out bar may be controlled.

13. A voting-machine comprising a casing having a front piece provided with a plurality of keyholes, a plurality of registers situated near the keyholes, a key insertible in the keyholes whereby the registers may be operated, a sliding lock-out bar movably supported whereby the keyholes may be closed to the key and the operation of the registers prevented, a frame whereby the lock-out bar may be moved across the keyholes and removed therefrom in a vertical direction, and means whereby the frame may be automatically operated by the voter when taking a position to vote.

14. A voting-machine comprising a casing having a front piece provided with a plurality of keyholes, a plurality of registers in proximity to the keyholes, a key insertible in the keyholes whereby the registers may be operated, a lock-out bar normally closing the keyholes to the key and having notches permitting the key to have access to a register and whereby the bar may be moved to close other keyholes to the key, and fingers on the lock-out bar whereby said other keyholes may be directly closed and the operation of the corresponding registers prevented.

15. A voting-machine comprising a casing having openings and keyholes therein, a longitudinally-sliding bar having notches at the lower edge thereof situate adjacent the keyholes, fingers attached to said bar adjacent to said notches, levers engaging said bar, and means suitably connected whereby said levers may be operated to elevate said bar automatically.

16. A voting-machine comprising a casing having a front piece provided with a plurality of keyholes and openings, registers situated adjacent said keyholes at said openings and provided with toothed wheels, longitudinally-movable lock-out bars supported adjacently to said keyholes, key-posts supported in positions ranging with said keyholes, and a key having a socket to receive said key-posts and having a blade whereby said toothed wheels may be engaged and the registers operated.

17. A voting-machine comprising a casing having a front piece provided with a plurality of keyholes and openings, registers situated adjacent said keyholes at said openings and provided with toothed wheels, key-posts supported in positions registering with said keyholes a key attachable to said key-posts whereby to engage said toothed wheels and operate said registers, a longitudinally-movable main operating and lock-out bar combined having notches at an edge thereof to receive the key whereby the said bar may be moved longitudinally, fingers on said bar whereby said key-posts may be closed to the key, means whereby said bar may be elevated, a sliding plate having notches therein situate adjacent the notches in said bar and provided with fingers adjacent the notches therein, and means whereby said plate may be operated to also lock out the key from said posts.

18. In a voting-machine, a casing provided with a plurality of keyholes and openings, vote-registers situated adjacent said keyholes at said openings and provided with toothed wheels, longitudinally-movable bars situated adjacent said keyholes and provided with notches at edges thereof, key-posts situated opposite said keyholes, means whereby said bars may be elevated, and a key attachable to said key-posts only when said bars are elevated, whereby said vote-registers may be operated, and means whereby said bars may be depressed to lock out said registers.

19. In a voting-machine, a casing provided with a plurality of keyholes and openings, vote-registers mounted at said openings, toothed wheels mounted adjacent said keyholes and connected with said registers, said keyholes and openings and said toothed wheels and registers being arranged in horizontal rows having a series of each in each row, a main operating-bar situated adjacent the upper series of keyholes and provided adjacent said keyholes with notches and fingers, a plurality of lock-out bars situated adjacent the lower series of keyholes, a bar for each horizontal row below said upper series, a connection between said main operating-bar and the lock-out bars for raising the latter by the movement of the former, and means connected with the casing whereby the main operating-bar may be raised.

20. In a voting-machine, a casing provided with a plurality of keyholes and openings in horizontal serial rows, registers situated adjacent said openings and provided with toothed wheels situated adjacent said keyholes, a longitudinally-movable main operating-bar situated adjacent to the upper horizontal row of keyholes and provided with notches adjacent said keyholes and also provided with recesses in the upper edge thereof, means for elevating said bar, a frame having projections resting upon the upper edge of said bar adjacent said recesses, a plurality of guides situated on said frame, a plurality of lock-out bars mounted on said guides and provided with notches adjacent the lower rows of keyholes, and key-posts supported opposite said keyholes.

21. In a voting-machine, a casing provided with a plurality of keyholes and openings in horizontal rows, key-posts opposite said keyholes, toothed wheels adjacent said key-posts, vote-registers at said openings operated by said toothed wheels, a longitudinally-movable main operating-bar adjacent the upper row of keyholes and provided with recesses in its upper edge and notches in its lower edge and having a shoulder near one end thereof, a movable spring-pressed member connected to said casing and also connected with said main operating-bar for lifting the same, and a spring-pressed follower for engaging said shoulder and moving said operating-bar longitudinally, said follower being also connected with said movable spring-pressed member.

22. In a voting-machine, a casing provided with a plurality of keyholes and openings in horizontal rows, key-posts opposite said keyholes, toothed wheels adjacent said key-posts, vote-registers at said openings connected with said toothed wheels, a longitudinally-movable main operating-bar adjacent the upper row of keyholes and provided with recesses in its upper edge and a shoulder near one end thereof, a movable spring-pressed member connected to said casing and also connected with said main operating-bar for lifting the same, a spring-pressed follower for engaging said shoulder and moving said operating-bar longitudinally, said follower being also connected with said movable spring-pressed member, a lock-out plate for said upper row of key-posts and provided with a projecting arm whereby said plate may also be moved by said follower.

23. In a voting-machine, a casing provided with a plurality of keyholes, key-posts opposite said keyholes, toothed wheels adjacent said key-posts, vote-registers connected with said toothed wheels, a ballot supported at a side of each vertical row of keyholes, a longitudinally-movable main operating-bar adjacent the upper horizontal row of keyholes and provided with notches at its lower edge adjacent said keyholes, a movable spring-pressed member for lifting said operating-bar and whereby the same may be permitted to descend, a plurality of longitudinally-movable lock-out bars provided with notches adjacent the lower rows of keyholes, a frame carrying said lock-out bars and connected with said main operating-bar, a sliding plate situated adjacent said operating-bar and provided with fingers and notches adjacent the fingers thereof, an arm attached to said plate situated at the end of the said frame and over the ends of said lock-out bars, a spring-pressed follower situated opposite said arm, and a shoulder on said operating-bar also opposite said follower.

24. In a registering-machine, a casing having openings and keyholes therein, a longitudinally-sliding bar situated adjacent said keyholes, notches and fingers at the lower edge of said bar, and a movable platform in front of said casing and connected with said bar for moving the same.

25. In a registering-machine, a casing having a front piece provided with a plurality of keyholes and openings, rollers situated adjacent said keyholes and provided with bands and toothed wheels, longitudinally-movable operating-bars situated adjacent said keyholes, posts opposite said keyholes, and a movable platform connected with said operating-bars for elevating the same.

26. In a registering-machine, a casing provided with a plurality of keyholes and openings, rollers situated adjacent said keyholes and provided with bands and toothed wheels, longitudinally-movable bars situated adjacent said keyholes and provided with notches at their lower edges, posts situated opposite said keyholes, and a movable platform connected with said bars for raising the same.

27. In a registering-machine, a casing provided with a plurality of keyholes and openings, rollers situated adjacent said keyholes and provided with bands and toothed wheels, a main operating-bar situated adjacent the upper keyholes and provided adjacent said keyholes with notches and fingers, a connection between said main operating-bar and a plurality of operating-bars for raising the latter by the movement of the former, and a movable platform connected with said operating-bar for raising the same.

28. In a registering-machine, a casing provided with a plurality of keyholes and openings, rollers situated adjacent said keyholes and provided with bands and toothed wheels, a longitudinally-movable main operating-bar situated adjacent to the upper keyholes and provided with notches adjacent said keyholes, depressions in the upper edge of said main operating-bar, a movable platform connected with said operating-bar for raising the same, a frame having projections resting upon the upper edge of said main operating-bar adjacent said depressions, a plurality of lock-out bars situated in said frame and provided with notches adjacent the lower keyholes, and posts opposite said keyholes.

29. In a registering-machine, a casing provided with a plurality of keyholes and openings, posts opposite said keyholes, a longitudinally-movable main operating-bar adjacent the upper keyholes and provided with depressions in its upper edge and with a shoulder and notches in its lower edge, a movable spring-pressed platform in front of said casing connected with said main operating-bar for lifting the same, and a spring-pressed follower for moving said operating-bar longitudinally, connected with said movable platform.

30. In a registering-machine, a casing provided with a plurality of keyholes, posts opposite said keyholes, a longitudinally-movable operating-bar adjacent the upper keyholes and provided with notches at its lower edge adjacent said keyholes, a movable spring-pressed platform for lifting said operating-bar, a plurality of longitudinally-movable bars carried by a frame connected with said operating-bar, notches in said bars situated adjacent the lower sets of keyholes, a sliding plate situated adjacent said operating-bar and provided with fingers adjacent said notches therein, a downwardly-extending arm upon said sliding plate situated over the end of said frame and over the ends of said bars, and a spring-pressed follower situated opposite the said arm and a shoulder on said operating-bar and connected with said movable platform.

In testimony whereof I affix my signature in presence of two witnesses.

CLEMENT DE CROES.

Witnesses:

JOHN N. CARDER,

FRANK G. HARDING.